3,051,542
PROCESS FOR DYEING OR PRINTING POLY-HYDROXYLATED MATERIALS
Hans Heinrich Bosshard and Heinrich Zollinger, Binningen, Switzerland, assignors to Ciba Limited, Basel, Switzerland
No Drawing. Filed May 4, 1959, Ser. No. 810,540
Claims priority, application Switzerland May 6, 1958
10 Claims. (Cl. 8—46)

This invention is based on the observation that dyeings that are fast to washing can be produced on polyhydroxylated materials, especially cellulosic textile materials, for example, cotton or regenerated cellulose, by impregnating the material to be dyed with an aqueous solution of an azo-dyestuff or coupling component which contains at least one isothiocyanate group and at least one acid group imparting solubility in water, subjecting the impregnated material to a heat treatment in the presence of a base, and, when a coupling component has been so applied to the material, treating it with an aqueous solution of a diazotized amine.

As dyestuffs suitable for use in the process there may be mentioned, for example, disazo- and monoazo-dyestuffs. Such dyestuffs are easily obtained by reacting thiophosgene with azo-dyestuffs which contain a primary, advantageously aromatically bound, amino group and at least one acid group imparting solubility in water, especially a sulfonic acid group. As examples of suitable amino-azo-dyestuffs there may be mentioned those of the benzene-azo-benzene, benzene-azo-diphenyl, benzene-azo-naphthalene or naphthalene-azo-naphthalene series, and those obtainable by coupling a diazotized aniline with an acto-acetic acid anilide or a heterocyclic compound containing an enolizable keto group, for example, a pyrazolone. A large number of such dyestuffs is known and can be obtained by coupling a diazotized amine with a coupling component.

Examples of suitable diazo-components are diazo-compounds of the following amines:

Aniline,
1-aminobenzene-2-, -3- or -4-sulfonic acid,
2-amino-1-methoxybenzene-4-sulfonic acid,
3-amino-2-hydroxybenzoic acid-5-sulfonic acid,
3-amino-6-hydroxybenzoic acid-5-sulfonic acid,
2-aminophenol-4-sulfonic acid,
5-acetylamino-3-aminobenzene-1-sulfonic acid,
1-amino-2-hydroxy-3-chloro-5-nitrobenzene,
4-acetylamino-2-aminobenzene-1-sulfonic acid,
5-acetylamino- or -5-benzoylamino-2-aminobenzene-1-carboxylic acid,
2-aminobenzoic acid-4- or -5-sulfonic acid,
1-aminonaphthalene-4-, -5-, -6- or -7-sulfonic acid,
1-amino-6-nitronaphthalene-4-sulfonic acid,
2-aminonaphthalene-4-, -6-, -7- or 8-sulfonic acid,
1-aminonaphthalene-3:6-disulfonic acid,
1-aminobenzene-2:5-disulfonic acid,
2-aminonaphthalene-3:6-disulfonic acid,
1-aminobenzene-2:5-disulfonic acid,
2-aminonaphthalene-4:8-, -5:7- or -6:8-disulfonic acid,
1-(3'- or -4'-aminobenzoyl)-aminobenzene-3-sulfonic acid,
3-aminopyrene-8- or -10-monosulfonic acid,
3-aminopyrene-5:8- or -5:10-disulfonic acid,
4-nitro-4'-aminostilbene-2:2'-disulfonic acid, furthermore O-acyl derivatives of aminonaphthol sulfonic acids, for example, O-acyl derivatives of 1-amino-8-hydroxynaphthalene-2:6- or -4:6-disulfonic acid, dehydrotoluidine mono- or di-sulfonic acid, etc.

There may also be mentioned as diazo-components amino-monoazo-dyestuffs, containing sulfonic acid groups, which can be obtained, for example, by coupling a diazotized monoacetyl derivative of an aromatic diamine with a coupling component containing an aromatic hydroxyl group or ketomethylene group, and subsequently hydrolyzing the acylamino-monoazodyestuff so obtained, for example, those obtainable by hydrolyzing an amino-monoazo-dyestuff obtainable from a phenol, naphthol, 5-pyrazolone, barbituric acid, hydroxy-quinoline, or β-keto-carboxylic acid derivative and a diazotized monoacyl-diaminobenzene, monoacyl-diaminostilbene disulfonic acid or the like. Also suitable are diazotizable amino-azo-dyestuffs obtained by coupling one of the aforesaid coupling components containing a primary amino group with a diazo-compound of one of the aforesaid amino-sulfonic acids.

The aforesaid diazo-components are coupled with coupling components and the components are so selected that the resulting azo-dyestuff contains at least one amino group and at least one group imparting solubility in water. As suitable coupling components there may be mentioned those of the benzene series, for example, aniline, methane sulfonic acid derivatives of aniline, of ortho-methoxyaniline and of ortho-aminobenzene carboxylic acids (the methane sulfonic acid being split up by hydrolysis after the production of the dyestuff to liberate the amino group), and also meta-toluidine, 3-acylamino-1-aminobenzenes, for example, 3-acetylamino-1-aminobenzene, 1-amino-5-methyl-2-methoxybenzene, 1-amino-2:5-dimethoxy- or -diethoxy-benzene, 1-amino-3-methoxybenzene, 1-amino-2-methoxy-5-isopropylbenzene or coupling components which are derived from β-keto-carboxylic acid esters or amides and are capable of coupling in the α-position, for example, actoacetic acid arylides, pyrazolones, especially 5-pyrazolones capable of coupling in the 4-position, such as 3-methyl-5-pyrazolone, 1-phenyl-3-methyl-5-pyrazolone, 1-phenyl-3-methyl-pyrazolone-2'- or -3'- or -4'-sulfonic acid, 1-phenyl-5-pyrazolone-3-carboxylic acid, 5-pyrazolone-3-carboxylic acid amides, barbituric acids, hydroxyquinolines such as 8-hydroxyquinoline or 2:4-dihydroxyquinoline, and phenols such as para-cresol, 4-acetylamino-1-hydroxybenzene - 4 - methyl - 2 - acetylamino-1-hydroxybenzene, 2-carboxy-1-hydroxybenzene, naphthols such as α- or β-naphthol, α- or β-naphthylamine, 2-hydroxynaphthalene sulfonic acid amides, and above all amino- and/or hydroxy-naphthalene sulfonic acids and their N-alkyl or N-aryl derivatives, such as 1-hydroxynaphthalene-3-, -4-, -5- or -8-sulfonic acid, 2-hydroxynaphthalene-4-, -5-, -6-, -7- or -8-sulfonic acid, 1:8-dihydroxynaphthalene-3:6-disulfonic acids, 1-hydroxynaphthalene-3:6- or -3:8-disulfonic acid, 1-aminonaphthalene-6-sulfonic acid, 1-amino-8-hydroxynaphthalene-2:4- or -3:6- or -4:6-disulfonic acid and N-acyl derivatives of aminonaphthol sulfonic acids which contain as the acyl radical, for example, an acetyl, propionyl, butyryl, chloracetyl, benzoyl, ortho-, meta- or para-chlorobenzoyl-nitrobenzoyl, tertiary butyl-benzoyl, 3'- or 4'-aminobenzoyl, methane or ethane sufonyl, paratoluene-sulfonyl or chlorobenzene-sulfonyl or a carbomethoxy or carbethoxy group.

When the coupling component contains no free amino groups, the diazo-component or the coupling component must contain a substituent convertible into an amino group, for example, a nitro or acylamino group, which can be converted into the amino group after coupling.

There may be used metalliferous azo-dyestuffs or complex metal compounds of azo-dyestuffs, especially of ortho:ortho'-dihydroxy-azo-dyestuffs, for example, those which contain 1–2 molecules of a monoazo-dyestuff bound in complex union with one atom of metal, for example, chromium, cobalt or copper.

Instead of the azo-dyestuffs, there may be used coupling components which contain at least one isothiocyanate group and at least one sulfonic acid group, for example, 2-isothiocyanate-5-hydroxynaphthalene-7-sulfonic acid, 2-isothiocyanate-8-hydroxynaphthalene-6-sulfonic acid, 1-isothiocyanate-8-hydroxynaphthalene-3:6-disulfonic acid or 1-isothiocyanate-8-hydroxynaphthalene-4:6-disulfonic acid, and the impregnated material, after fixation of the coupling component thereof, is treated with an aqueous solution of a diazonium salt of one of the aforesaid diazo-components, whereby coupling to form the azo-dyestuff takes place on the fiber.

The reaction of the aminoazo-dyestuff or the coupling component containing an amino group with thiophosgene is advantageously carried out in an aqueous solution of the sodium salt of the dyestuff or coupling component. It is desirable, however, to use a small excess, for example, of about 10%, of thiophosgene. The reaction takes place at room temperature. It has, however, been found of advantage to heat the reaction mixture, preferably not above 60° C. The isothiocyanate so formed is advantageously precipitated by the addition of a water-soluble inorganic salt, especially sodium chloride or sodium sulfate.

The material to be dyed is dyed in an aqueous solution containing a salt, advantageously at only a moderately raised temperature and in the presence of a base. As bases there may be used, for example, fairly strongly alkaline, preferably inorganic, compounds such as trisodium phosphate, sodium carbonate, potassium cyanate and above all alkali metal or alkaline earth metal hydroxides such as sodium hydroxide or potassium hydroxide. The proportion of the acid binding agents of the above kind may vary within wide limits.

It is of advantage to use a proportion such that the solution has a pH value of at least 10. There are advantageously used solutions which contain at least 0.5 gram of alkali metal hydroxide per liter.

The impregnation of the material to be dyed with the dyestuff solution or solution of the coupling component is advantageously carried out by padding. For this purpose the material to be dyed is impregnated with the aqueous dyestuff solution advantageously in the cold or at a moderately raised temperature, and then squeezed in the usual manner, advantageously to an extent such that the impregnated material retains 0.5 to 1.3 parts of its original weight of dyestuff solution.

The fixation of the dyestuff or coupling component on the impregnated material is carried out after the impregnation. For this purpose, for example, the impregnated material, if desired, after being dried and, when the impregnating solution contains no inorganic acid-binding agent, subjected to treatment with an aqueous alkaline solution of an inorganic acid-binding agent which is at least as alkaline as sodium carbonate, for example, with an alkali metal hydroxide solution containing a salt, at a raised temperature or in the cold, and heated for a short time with steam or, for example, in a current of hot air or on a heated cylinder. By using a practically neutral impregnating bath containing no substance yielding alkali, the impregnated material may, if desired, be allowed to stand for a long time prior to the fixation, and this may be an advantage with the type of apparatus available. Instead of carrying out the fixation with the use of a separate bath of alkali, an inorganic alkali or a substance yielding an alkali, such as sodium carbonate, may be present in the impregnating solution from the outset, and the impregnated material subjected, without intermediate treatment in a bath of alkali and intermediate drying, directly to steaming or a heat treatment.

Instead of applying the aforesaid dyestuffs or dyestuff components by impregnation they may be applied to the material to be dyed by printing, for example, with a printing paste which contains, in addition to the assistants customarily used in printing, such as wetting and thickening agents, at least one of the aforesaid dyestuffs and a potentially alkaline substance, that is to say, a substance capable of yielding an acid-binding agent, for example, on being heated. As such a substance there may be mentioned sodium bicarbonate. When the printing paste used does not contain such a substance, the printed material is subjected to treatment with an alkali, preferably in a solution of an alkali metal carbonate containing a high concentration of a salt or a solution of an alkali metal carbonate or an alkaline earth metal hydroxide containing a high concentration of a salt, followed by a heat treatment, if desired in the presence of steam. If the printing paste contains an inorganic acid-binding agent or an inorganic substance which, for example when heated, becomes as alkaline as sodium carbonate, the printed material need not be subjected to a treatment with an alkali before it is heated or steamed.

By the process of this invention there are obtained on polyhydroxylated, more especially cellulosic, fibrous materials very valuable, strong, generally very full dyeings having excellent properties of wet fastness and a good fastness to light.

In certain cases it may be of advantage to subject the dyeings obtained by the process to an after-treatment. Thus, for example, it is of advantage to soap the resulting dyeings. By this after-treatment any dyestuff that has not been completely fixed on the material is removed therefrom.

The following examples illustrate the invention, the parts and percentages being by weight unless otherwise stated, and the relationship of parts by weight to parts by volume being the same as that of the kilogram to the liter:

*Example 1*

1 part of the dyestuff of the formula

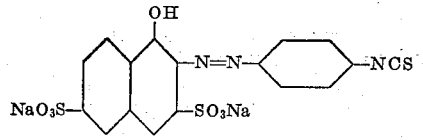

is dissolved in 100 parts of water. A cotton fabric is impregnated with this solution on a padder at 20° C., and then squeezed to a weight increase of 75%. The impregnated fabric is dried and then impregnated at room temperature with a solution containing per liter 10 grams of sodium hydroxide and 300 grams of sodium chloride, squeezed to a weight increase of 75%, steamed for 60 seconds at 100 to 101° C., rinsed, treated in a sodium bicarbonate solution of 0.5% strength, rinsed, soaped for 15 minutes in a boiling 0.3% solution of a non-ionic detergent, again rinsed and finally dried. A bluish red dyeing of very good fastness to washing is thus obtained.

The dyestuff used in this example can be prepared in the following manner:

3 parts of the dyestuff of the formula

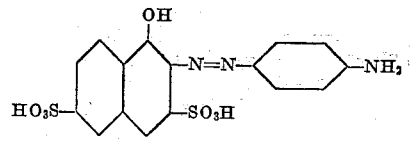

are dissolved in 70 parts of water and, while being stirred, gradually treated with 1 part of thiophosgene. While continuing the stirring, the temperature is raised to 50° C. within 2 hours. The reaction product is precipitated with sodium chloride, suctioned off and washed with acetone to remove the unreacted thiophosgene. The moist filter cake is dried in vacuo at a temperature not exceeding 50° C.

*Example 2*

1 part of the dyestuff used in Example 1 is dissolved in 100 parts of water together with 1 part of pyridine, 2 parts of anhydrous sodium carbonate and 10 parts of urea.

A cotton fabric is impregnated with this solution on a padder at 20° C., and then squeezed to a weight increase of 75%. The impregnated material is dried at 20 to 25° C. and then heated in an air bath for 6 minutes at 140°, rinsed, soaped for 15 minutes with a boiling solution containing 0.3% of a non-ionic detergent and 0.2% of tertiary sodium phosphate, rinsed and dried. A bluish red dyeing of good fastness to washing is obtained.

*Example 3*

A number of further dyestuffs are listed in column I of the following table which dye cotton by the methods described in Examples 1 and 2 the tints shown in column II.

The dyestuffs listed above can be prepared by reaction of the appropriate aminoazo dyestuffs with thiophosgene by the process described in the 2nd paragraph of Example 1.

*Example 4*

A cotton fabric is padded with a solution of 3 parts of 2-isothiocyanate - 5 - hydroxynaphthalene-7-sulfonic acid, 3 parts of sodium hydroxide solution of 36° Bé. and 4 parts of urea in 100 parts of water and then squeezed to a weight increase of 75%. The impregnated fabric is then steamed for 5 minutes at 100 to 101° C.

A part of the fabric treated in this manner is rinsed and then developed in a neutral to weakly alkaline bath

| | I<br>Dyestuff | II<br>Tint of wool |
|---|---|---|
| 1 | 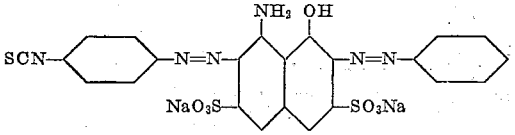 | bluish green. |
| 2 |  | Do. |
| 3 | Chromium complex of the monoazo-dyestuff of the formula<br>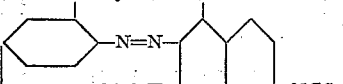 | pure blue. |
| 4 | 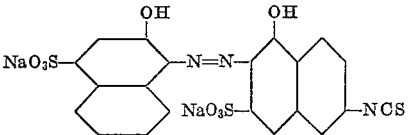 | black. |
| 5 | 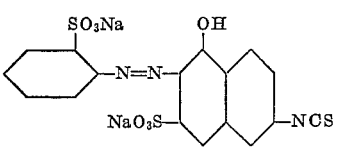 | orange. |
| 6 | 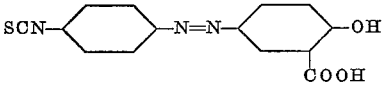 | yellow. |
| 7 | 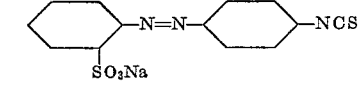 | Do. |
| 8 | 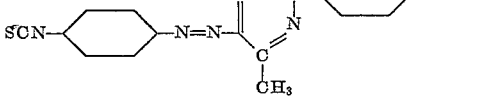 | reddish yellow. | with a para-nitrobenzene-diazonium chloride solution, then rinsed, and soaped for 15 minutes in a boiling 0.3% solution of a non-ionic detergent.

A strong red dyeing of excellent fastness to washing results.

Another part of the impregnated fabric is rinsed, soaped for 15 minutes in a boiling 0.3% solution of a non-ionic detergent and rinsed. Development with para-nitrobenzene-diazonium chloride solution in a neutral to weakly alkaline bath, followed by soaping, likewise produces a red dyeing of good fastness to washing.

The 2-isothiocyanate-5-hydroxynaphthalene-7-sulfonic acid used in this example can be prepared in the following manner:

2 parts of the sodium salt of 2-amino-5-naphthol-7-sulfonic acid in a concentrated aqueous solution are mixed at 20° C. with 1 part of thiophosgene and heated with stirring within 2 hours to 40° C. The reaction product of the formula

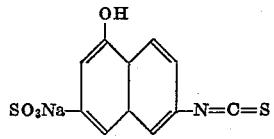

is precipitated with sodium chloride, suctioned off, washed with acetone, and dried in vacuo at 30° C.

*Example 5*

30 parts of the dyestuff used in Example 1 are dissolved in 339 parts of water, 150 parts of urea are added, the whole is introduced into 450 parts of a sodium alginate thickening, and 30 parts of potassium carbonate and 1 part of sodium hydroxide solution of 40% by volume strength are added. A cotton fabric is printed with the resulting printing paste in the usual manner and then dried, steamed for 5 minutes at 100 to 101° C., rinsed soaped, again rinsed and finally dried. This procedure yields a bluish red print pattern.

What is claimed is:

1. A process for dyeing and printing textile material selected from the group consisting of natural and regenerated cellulose, which comprises impregnating the material to be dyed with an aqueous solution of a member selected from the group consisting of an azo-dyestuff and a coupling component, which contains at least one acid group imparting solubility in water and at least one isothiocyanate group, fixing the member selected from the group consisting of the azo-dyestuff and the coupling component to the said material in the presence of a base, and, when the member of the last-named group fixed on the material is a coupling component, treating the material with an aqueous solution of a diazotized arylamine.

2. A process as claimed in claim 1, which comprises fixing in the presence of an inorganic salt.

3. A process as claimed in claim 1, which comprises impregnating at a temperature of at most 50° C.

4. A process as claimed in claim 1, the member selected from the group consisting of dyestuff and coupling component being applied by padding.

5. A process as claimed in claim 1, which comprises heating the material impregnated with the first named solution and the base at a temperature within the range of 100° C. to 150° C.

6. A process as claimed in claim 1, which comprises drying the material between impregnating and fixing treatment.

7. A process as claimed in claim 1, the said base being selected from the group consisting of an alkali metal hydroxide, an alkali metal carbonate and an alkali metal phosphate.

8. A process as claimed in claim 7, the proportion of base being such that the dyebath has a pH value above 10.

9. Textile material selected from the group consisting of natural and regenerated cellulose dyed by the process claimed in claim 1.

10. Textile material, selected from the group consisting of natural and regenerated cellulose printed by the process claimed in claim 1.

References Cited in the file of this patent

UNITED STATES PATENTS

| | | |
|---|---|---|
| 1,916,314 | Hilger | July 4, 1933 |
| 2,126,468 | Holzach et al. | Aug. 9, 1938 |
| 2,430,484 | Strain et al. | Nov. 11, 1947 |
| 2,768,053 | Streck | Oct. 23, 1956 |
| 2,873,269 | Fasciati et al. | Feb. 10, 1959 |

UNITED STATES PATENT OFFICE
CERTIFICATE OF CORRECTION

Patent No. 3,051,542            August 28, 1962

Hans Heinrich Bosshard et al.

It is hereby certified that error appears in the above numbered patent requiring correction and that the said Letters Patent should read as corrected below.

Column 1, line 34, for "acto-acetic" read -- acetoacetic --; column 2, line 33, for "actoacetic" read -- acetoacetic --; column 7, lines 20 to 25, the formula should appear as shown below instead of as in the patent:

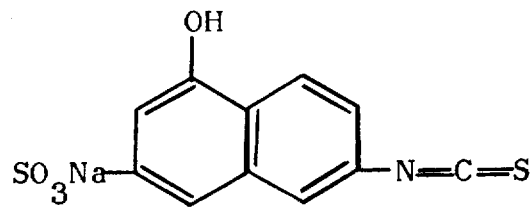

Signed and sealed this 3rd day of September 1963.

(SEAL)
Attest:
ERNEST W. SWIDER
Attesting Officer

DAVID L. LADD
Commissioner of Patents